(12) United States Patent
Miyano

(10) Patent No.: US 6,574,351 B1
(45) Date of Patent: Jun. 3, 2003

(54) DESTINATION ADDRESS AREA DETECTION APPARATUS

(75) Inventor: Hiroyoshi Miyano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/479,337

(22) Filed: Jan. 7, 2000

(30) Foreign Application Priority Data

Jan. 13, 1999 (JP) .......................................... 11-006801

(51) Int. Cl.⁷ .............................. G06K 9/00; G06K 9/34
(52) U.S. Cl. ......................... 382/101; 382/102; 382/180
(58) Field of Search .................................. 382/102, 101

(56) References Cited

U.S. PATENT DOCUMENTS

| | | | | |
|---|---|---|---|---|
| 5,737,437 A | * | 4/1998 | Nakao et al. | 382/101 |
| 6,014,450 A | * | 1/2000 | Heilper et al. | 382/101 |
| 6,269,171 B1 | * | 7/2001 | Gozzo et al. | 382/101 |
| 6,421,451 B1 | * | 7/2002 | Shiratsuchi et al. | 382/101 |

FOREIGN PATENT DOCUMENTS

| | | |
|---|---|---|
| JP | 5-307639 | 11/1993 |
| JP | 7-265807 | 10/1995 |

OTHER PUBLICATIONS

A. P. Whichello, et al., "Locating Address Blocks and Postcodes in Mail–Piece Images", *Proceedings of 13th International Conference on Pattern Recognition*, 1996, pp. 716–720.

\* cited by examiner

*Primary Examiner*—Leo Boudreau
*Assistant Examiner*—Hussein Akhavannik
(74) *Attorney, Agent, or Firm*—Dickstein, Shapiro, Morin & Oshinsky, LLP.

(57) ABSTRACT

The present invention provides a destination area detection apparatus comprising: destination area candidates generator 21; feature amount extractor 22 for calculating a feature amount of each of the destination area candidates; storage unit 3 for storing a feature amount and a destination probability of the destination area candidate for the feature amount in correlation with an addresser probability which is a probability of an area other than the destination but has an identical configuration as the destination; destination-addresser probability calculator 23 for conversion into a destination probability and addresser probability of each of the destination area candidate by referencing the feature amount in the storage unit 3; sorting unit 24 for deciding the order of the destination area candidates according to the obtained destination probability and the addresser probability; and output candidate decision unit 25 for selecting a predetermined number of destination area candidates having higher destination probabilities.

5 Claims, 12 Drawing Sheets

FIG. 6

| DESTINATION AREA CANDIDATE | FEATURE AMOUNT | | |
|---|---|---|---|
| | x | y | .. |
| $G_1$ | 600 | 80 | .. |
| $G_2$ | 480 | 80 | .. |
| $G_3$ | 230 | 60 | .. |
| $G_4$ | 170 | 170 | .. |
| $G_5$ | 250 | 160 | .. |

FIG. 7

| DESTINATION AREA CANDIDATE | DESTINATION PROBABILITY p | ADDRESSER PROBABILITY q | DESIGN PROBABILITY r |
|---|---|---|---|
| $G_1$ | 0.05 | 0.05 | 0.90 |
| $G_2$ | 0.10 | 0.20 | 0.70 |
| $G_3$ | 0.30 | 0.10 | 0.60 |
| $G_4$ | 0.48 | 0.15 | 0.37 |
| $G_5$ | 0.38 | 0.05 | 0.57 |

FIG. 8

| FEATURE AMOUNT | | PROBABILITY | | |
|---|---|---|---|---|
| x | y | ADDRESSER PROBABILITY | DESTINATION PROBABILITY | DESIGN PROBABILITY |
| ... | ... | ... | ... | ... |
| 100~110 | 50~55 | 0.80 | 0.10 | 0.10 |
| 110~120 | 50~55 | 0.70 | 0.20 | 0.10 |
| 120~130 | 50~55 | 0.60 | 0.05 | 0.35 |
| ... | ... | ... | ... | ... |

| DESTINATION AREA CANDIDATE | p | q / (p+q) | SCORE p−q / (p+q) |
|---|---|---|---|
| $G_1$ | 0.05 | 0.5 | −0.45 |
| $G_2$ | 0.10 | 0.67 | −0.57 |
| $G_3$ | 0.30 | 0.25 | 0.05 |
| $G_4$ | 0.48 | 0.24 | 0.24 |
| $G_5$ | 0.38 | 0.12 | 0.26 |

FIG.15

| DESTINATION AREA CANDIDATE | DESTINATION PROBABILITY $p'$ | ADDRESSER PROBABILITY $q'$ | DESIGN PROBABILITY $r'$ |
|---|---|---|---|
| $G_1$ | 0.04 | 0.05 | 0.95 |
| $G_2$ | 0.08 | 0.22 | 0.78 |
| $G_3$ | 0.23 | 0.14 | 0.86 |
| $G_4$ | 0.37 | 0.29 | 0.71 |
| $G_5$ | 0.29 | 0.08 | 0.92 |

FIG.16

| OLD PROBABILITY | | NEW PROBABILITY |
|---|---|---|
| OLD DESTINATION PROBABILITY $p$ | OLD DESTINATION PROBABILITY MAXIMUM VALUE $p$ | NEW DESTINATION PROBABILITY $p'$ |
| ... | ... | ... |
| 0.30~0.35 | 0.90~0.95 | 0.20 |
| ... | ... | ... |
| 0.30~0.35 | 0.05~0.10 | 0.70 |
| ... | ... | ... |
| 0.80~0.85 | 0.20~0.25 | 0.90 |
| ... | ... | ... |

FIG.18

| DESTINATION AREA CANDIDATE | p' | q'/(p'+q') | SCORE p'−q'/(p'+q') |
|---|---|---|---|
| $G_1$ | 0.04 | 0.56 | −0.52 |
| $G_2$ | 0.08 | 0.73 | −0.65 |
| $G_3$ | 0.23 | 0.38 | −0.15 |
| $G_4$ | 0.37 | 0.44 | −0.07 |
| $G_5$ | 0.29 | 0.29 | 0.07 |

DESTINATION ADDRESS AREA DETECTION APPARATUS

BACKGROUND OF THE INVENTION

1. Field of the Invention

The present invention relates to a destination address area detection apparatus for detecting a destination address area where a destination of postal piece is written.

2. Description of the Related Art

Conventionally, in such a destination address area detection apparatus, a postal piece image is divided into several parts to obtain some parts containing a part of a destination. (Hereinafter, an area of destination address will be referred to as a destination address area, and the partial areas of a postal piece image will be referred to as destination address area candidates.) In this case, it is necessary to output a destination address area without detecting an addresser area having identical configuration as the destination address.

To cope with this, a destination likelihood degree is assigned to each of the destination address area candidates and only a predetermined number of candidates are output. For example, proceedings of 13th International Conference on Pattern Recognition, Volume III Track C contains Adrian P. Whichello and Hong Yan "Locating Address Blocks and Postcodes in Mail-Piece Images (PP. 716 to 720), which (page 719) describes a method to select an address area candidate, starting at a location immediately below the center line of a postal piece image, utilizing that the smaller the distance from the center line, the address area candidate has a higher probability to be an address area.

However, this conventional method has a problem that an addresser area having an identical configuration as the destination address may be recognized as a destination address.

SUMMARY OF THE INVENTION

It is therefore an object of the present invention to provide an address area detection apparatus capable of reducing the danger of erroneous detection of an addresser address as a destination address and enhancing the address area detection accuracy.

The destination area detection apparatus according to the present invention comprises: destination area candidate generator for generating a plurality of destination area candidates including a destination area according to partial images of a mail piece image; feature amount calculator for calculating a feature amount of each of the destination area candidates; storage unit for storing in advance a feature amount and a destination probability representing probability that a destination area candidate is a destination area according to the feature amount, in correlation with an addresser probability which is a probability of an area having an address configuration other than the destination; feature amount converter for converting the feature amount of each of the destination area candidates into a destination probability and an addresser probability while referencing the storage unit; sorting unit for deciding the order of the destination area candidates in a descending order of the destination probability according to the destination probability and the addresser probability; and destination area selector for selecting a predetermined number of destination area candidates having higher destination probabilities.

This invention takes into consideration not only the probability that a destination area candidate created according to a partial image of a mail piece image is a destination, but also an addresser probability of a destination area candidate other than a destination area but having an address configuration. By using the destination probability and the addresser probability, the order of the destination area candidates is determined, and a predetermined destination area candidate are selected according to the order obtained. This reduces an erroneous detection of an area other than a destination but having an address configuration, thus increasing the detection accuracy of the destination area.

BRIEF DESCRIPTION OF THE DRAWINGS

FIG. 6 shows feature amounts of the respective destination area candidates obtained by the feature amount extractor.

FIG. 7 shows as an example probabilities obtained by the destination-addresser probability calculator.

FIG. 8 shows a specific example of a conversion table of a destination-addresser distribution dictionary.

FIG. 15 shows an example of new probabilities for each of the destination area candidates obtained by the destination probability converter.

FIG. 16 shows an example of the destination probability conversion dictionary.

FIG. 18 shows scores of the respective destination area candidates obtained by the sorting unit.

DESCRIPTION OF THE PREFERRED EMBODIMENTS

Description will now be directed to an embodiment of the present invention with reference to the attached drawings.

Figure 1:
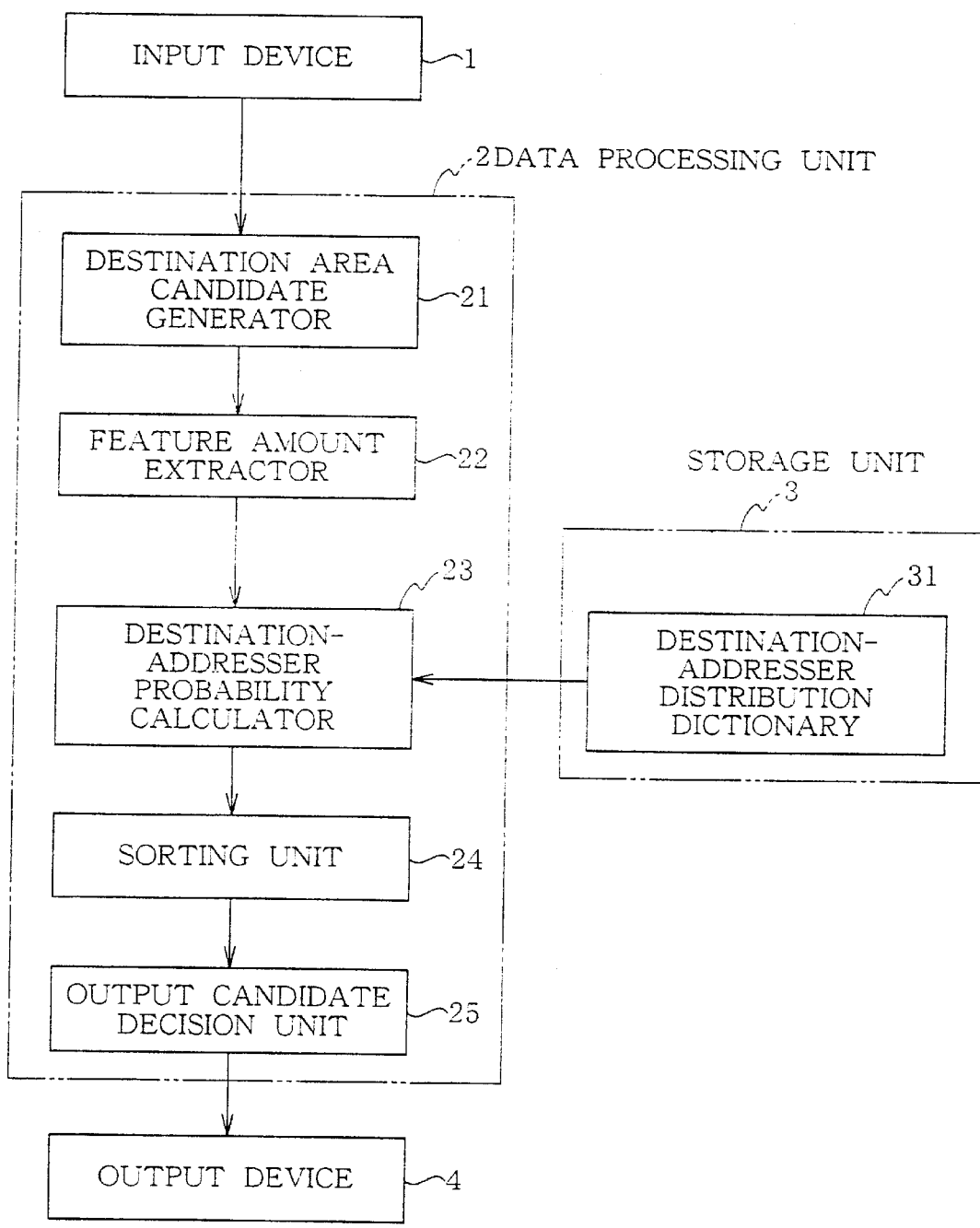
FIG. 1 is a block diagram of a destination area detection apparatus according to a first embodiment of the present invention.

FIG. 1 is a block diagram of a destination address area detection apparatus according to a first embodiment of the present invention. In FIG. 1, the destination address area detection apparatus includes: an input unit 1 such as a scanner; a data processing unit 2 operated by a program control; a storage unit 3 for storing data; and an output unit 4. The input unit 1 is used for entering a postal piece image to be processed. The data processing unit 2 includes destination area candidate generator 21, feature amount extractor 22, destination-addresser probability calculator 23, sorting unit 24, and output candidate decision unit 25. The storage unit 3 includes an addressee-addresser distribution dictionary 31. The output unit 4 outputs a predetermined number of destination address area candidates having higher probability to be a destination address.

Next, explanation will be given on the internal configuration of the data processing unit 2. Firstly, definitions of terms used in this specification will be given. An "area" is a partial image of a postal piece image entered by the input unit 1. A "destination area" is a part of a destination in the postal piece image entered through the input unit 1. An area having an address of an addresser will be referred to as an addresser area. Moreover, the area other than the destination address and the addresser address will be referred to as a design area. The design area excludes a destination area and an addresser area.

Figure 2:
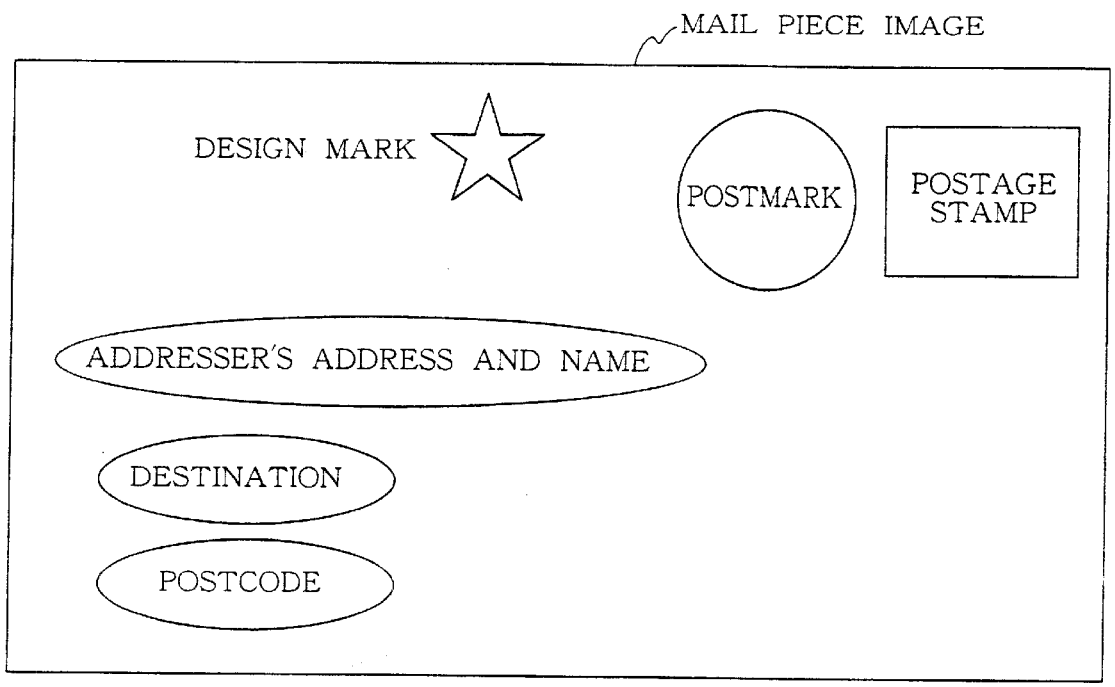
FIG. 2 shows an example of a mail piece image.
Figure 3:
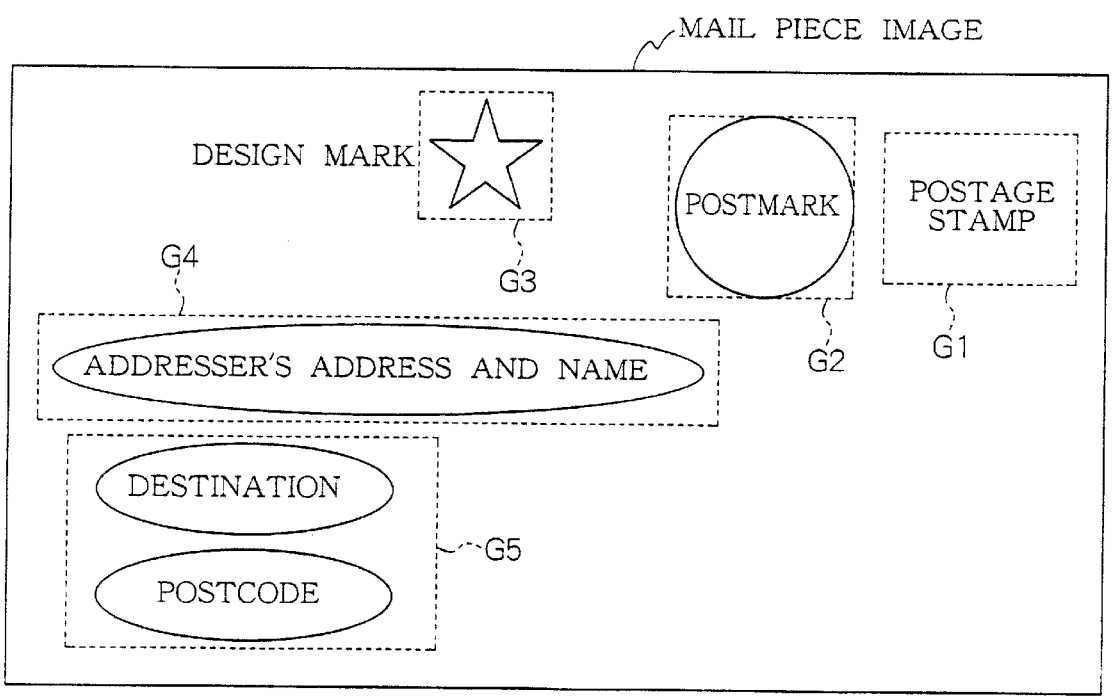
FIG. 3 shows a plurality of destination area candidates created from the mail piece image.
Figure 4:
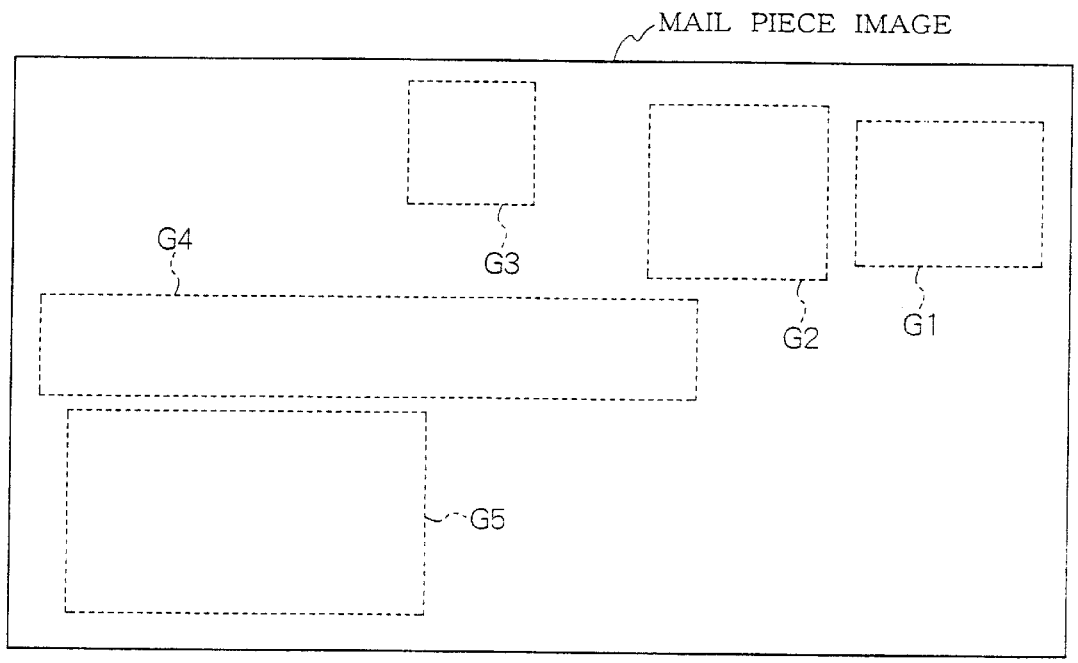
FIG. 4 shows the destination area candidates of FIG. 3 excluding the image.

The destination area candidate generator 21 generates a plurality of areas including a destination area, from the postal piece image entered from the input unit 1. Hereinafter, each of the areas will be referred to as a destination area candidate. For example, in a postal piece image as shown in FIG. 2, the destination area candidate generator 21 generates destination area candidates G1, G2, G3, G4, and G5 as shown in FIG. 3. Moreover, FIG. 4 shows only locations of the five destination area candidates generated by the destination area candidate generator 21. Among the plurality of destination area candidates generated by the destination area candidate generator 21, only one is the actual destination area. The other destination area candidates may be an addresser area or design area.

Figure 5:
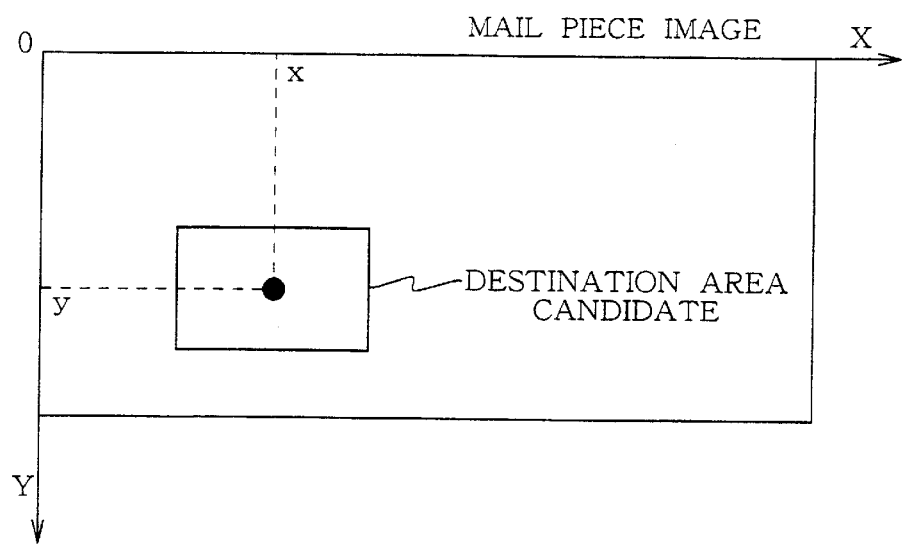
FIG. 5 explains a feature amount of feature amount extractor.

The feature amount extractor 22 extracts a feature amount required for calculating the destination-addresser probability according to the destination-addresser distribution dictionary 31 for the destination area candidate obtained by the destination area candidate generator 21. As shown in FIG. 5, the feature amount may be an absolute position (x coordinate and y coordinate with respect to the origin O) of the center of the destination area candidate. Here, the coordinates can be expressed by the number of pixels, but it is not essential. FIG. 6 shows feature amounts of the destination area candidates G1, G2, G3, G4, and G5 in FIG. 4. For example, the destination area candidate G1 has a feature amount x600 and y80, and the destination area candidate G2 has a feature amount of x480 and y80. These feature amounts are used for calculating the destination-addresser probability according to the destination-addresser distribution dictionary 31.

Here, explanation will be given on the definition of the destination probability, addresser probability, and the design probability. For a single destination area candidate, the probability that a destination area candidate can be a destination area according to the feature amount extracted from the destination area candidate will be referred to as the destination probability of the destination area candidate. Moreover, the probability that a destination area candidate can be an addresser area according to the feature amount extracted from the destination area candidate will be referred to as the addresser probability of the destination area candidate. Furthermore, the probability that a destination area candidate can be a design area according to the feature amount extracted from the destination area candidate will be referred to as the design probability of the destination area candidate. The design probability of each destination area candidate can be obtained by 1 subtracted by the destination probability and the addresser probability. The destination probability, the addresser probability, and the design probability of the destination area candidates G1, G2, G3, G4, and G5 in FIG. 4, for example, are as shown in FIG. 7. In the example of FIG. 7, for example, the destination area candidate G2 has a destination probability of 0.10, an addresser probability 0.20, and a design probability of 0.70.

The destination-addresser probability calculator 23 calculates the destination probability, addresser probability, and design probability of all the destination area candidates according to the feature amounts obtained by the feature amount extractor 22 and by using the destination-addresser distribution dictionary 31. The sorting unit 24 arranges the destination area candidates in the descending order of probability of the destination area according to the destination probability and the addresser probability obtained by the destination-addresser calculator 23. The sequence of the all the destination area candidates can be obtained as follows. Firstly, a score m obtained by a destination area candidate is calculated from its destination probability and addresser probability. The score m can be obtained by an equation as follows, where p is the destination probability and q is the addresser probability of the destination area candidate.

[Equation 1]

$$m=f(p)-g(q/(p+q)) \quad (1)$$

wherein the functions f and g use u as an argument: $f(u)=u$, and $g(u)=u$. This equation (1) is preferable because $q/(p+q)$ represents a probability that the destination area candidate is not a destination area when assuming that the destination area candidate is a destination area or an addresser area. This score calculation is performed for all the destination area candidates, and the sequence of the destination area candidates is determined according to the scores in the descending order. In the Equation (1) for the scores m, it is assumed that $f(u)=u$ and $g(u)=u$ for the argument u. However, f(u) and g(u) may be any if it is a monotone increasing function of the argument u.

Moreover, it is also possible to use Equation (2), (3), (4), (5), or (6) instead of the Equation (1).

[Equation 2]

$$m=f(p)/g(q/(p+q)) \quad (2)$$

[Equation 3]

$$m=f(p)-g(q) \quad (3)$$

[Equation 4]

$$m=f(p)/g(q) \quad (4)$$

[Equation 5]

$$m=f(p)+g(p/(p+q)) \quad (5)$$

[Equation 6]

$$m=f(p) \times g(p/(p+q)) \quad (6)$$

Like the Equation (1), the equation (2) is preferable because $q/(p+q)$ represents a possibility that the destination area candidate is not a destination area when assuming that the destination area candidate is a destination area or addresser area. The Equation (3) and Equation (4) area preferable because f(p) represents a destination area probability of the destination area candidate, and g(q) represents an addresser probability of the destination area candidate. Moreover, the Equation (5) and the Equation (6) are preferable because of the same reasons of Equation (1) and Equation (2) since $1-q/(p+q)=p/(p+q)$.

In the sorting unit 24, all the destination area candidates are arranged in the descending order of the scores calculated from the destination probability and the addresser probability of the destination area candidate. This can also be performed as follows. For example, there are n destination area candidates. When the n destination area candidates are arranged in a certain order, if it is assumed for the i-th destination area candidate (i=1, . . . , n), the destination probability pi, the addresser probability qi, and the design probability ri, then the probability P that a destination area precedes an addresser area can be calculated as follows.

[Equation 7] (7)

$$P = p_1 + \sum_{j=2}^{n} \left\{ \left( \prod_{i=1}^{j-1} r_i \right) \cdot p_j \right\}$$

The sequential order is obtained for all the n destination area candidates and by calculating the probability P for the respective destination area candidate order, it is possible to obtain an order having the maximum P.

The output candidate decision unit 25 selects a predetermined number of candidates, starting at the beginning of the order assigned to the destination area candidates obtained in the sorting unit 24, and outputs the selected destination area candidates.

Next, explanation will be given on the storage unit 3. The storage unit 3 has the destination-addresser distribution dictionary 31. As shown in FIG. 8, the destination-addresser distribution dictionary 31 is constituted by a conversion table between feature amount range and a destination probability, addresser probability, and design probability having the feature amounts in that range. Note that FIG. 8 shows only a part of the conversion table. Here, in FIG. 8, "100 to 110" means equal to or greater than 100 but less than 110. Conversion of a feature amount into a probability using the conversion table of FIG. 8 is performed as follows. For example, if a destination area candidate has a center position having an x coordinate of 110 to 120 and y coordinate of 50 to 55, then the destination area candidate has a destination probability, addresser probability, and design probability of 0.70, 0.20, and 0.10, respectively.

Next, explanation will be given on operation of the present embodiment. Firstly, a postal piece to be read is read by an input unit 1 constituted by a scanner and camera, so as to read an image information on the surface where the destination is written. For example, it is assumed that the postal piece image of FIG. 2 has been read by the input unit 1. The postal piece image information read by the input unit 1 is supplied to the destination area candidate generator 21. In the destination area candidate generator 21, as has been described above, a plurality of destination area candidates including the destination area are generated according to the partial image of the postal piece image.

In the destination area candidate generator 21, a plurality of destination area candidates including the destination area are generated by using, for example, the method disclosed in Anil K. Jain and Sushil K. Bhattacharjee "Address Block Location on Envelopes Using Gabor Filters" on page 1470 in Pattern Recognition, vol. 25, No. 12, 1992, pp. 1459 to 1477. And, as shown in FIG. 3, five destination area candidates G1, G2, G3, G4, and G5 are generated. FIG. 4 shows only positions of the five destination area candidates. G1 is a region of postage stamps and accordingly is a design area. G2 is a region of postmark and accordingly is a design area. G3 is a region of a picture and accordingly is a design area. G4 is a region of an addresser's address and accordingly, is an addresser area. G5 is a destination area. However, immediately after the destination area candidates are generated by the destination area candidate generator, it is unknown whether the destination area candidates are destination area, addresser area, or design area.

Figures 9, 10:
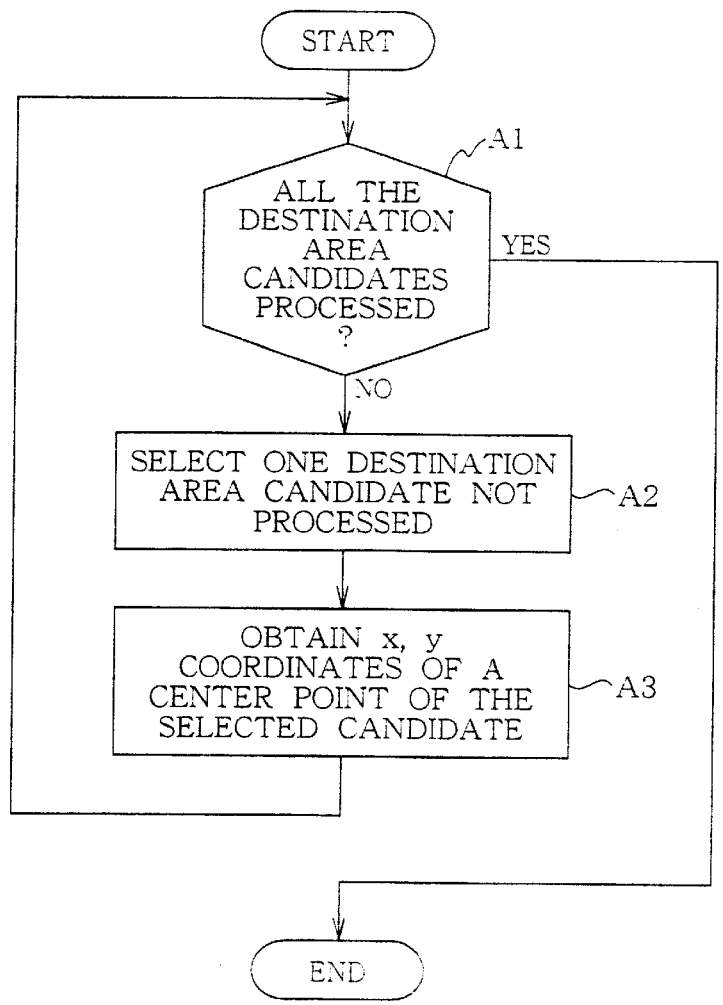
FIG. 9 shows an example of scores determined by the sorting unit.
FIG. 10 is a flowchart showing a process flow of the feature amount extractor.

The destination area candidates G1, G2, G3, G4, and G5 generated by the destination area candidate generator 21 are supplied to the feature amount extractor 22. FIG. 10 is a flowchart showing the processing flow in the feature amount extractor 22. Firstly, it is determined whether all the destination area candidates have been subjected to the processing (step A1). If any candidates have not been processed, one is selected (step A2). The selection order may be any order. Next, a feature amount is calculated for the selected destination area candidate (step A3). The feature amount, as has been explained in FIG. 5, is constituted by the coordinates x and y of the absolute position when the origin 0 and x axis and y axis are determined on the postal piece image. The feature amount extractor 22 repeats the processing of steps A1 to A3 so as to calculate the feature amounts for all the destination area candidates. The destination area candidates G1, G2, G3, G4, and G5 shown in FIG. 4 respectively have center point whose absolution positions are indicated by x and y in FIG. 6. In FIG. 6, for example, the destination area candidate G2 has a feature amount x of 480 and y of 80. In this embodiment, the coordinate unit is the number of pixels. However, this is not an essential problem.

It should be noted that a feature amount of a destination area candidate may be other than the absolute position of the destination area candidate. For example, it is also possible to use a relative position with respect to the other destination area candidate, or a position obtained when the postal piece image is normalized, or a width or height of a rectangular shape circumscribing a destination area candidate. Moreover, it is possible to use the method disclosed in Japanese Patent Publication No. 7-105575. That is, a character line is extracted and according to a feature amount such as the leftmost x coordinate, a line arrangement information can be obtained whether that coordinate value is identical for all the lines. Furthermore, the line image can be digitized by the method described in T. Ankyoin and T. Nagao "Gazo no shori to ninnsiki (Image processing and recognition)", 1992, pp. 14 to 17, so as to obtain a white/black reverse count in the horizontal direction and an average black pixel continuation or most frequent value, so that an average feature amount can be used for all the character lines.

The destination-addresser distribution dictionary 31 is, as shown in FIG. 8, a conversion table between a range of feature amounts of a destination area candidate and a corresponding destination probability, addresser probability, and design probability. In the example of FIG. 8, the conversion table is for conversion between a combination of x and y feature amounts and a probability value. However, it is also possible to calculate a new feature amount according to a plurality of feature amounts including a feature amount other than x and y and to create a conversion table between the new feature amount and the probability value.

The destination-addresser probability calculator 23, referring to the destination-addresser distribution dictionary 31, performs a processing to obtain a destination probability, addresser probability, and design probability of the respective destination area candidates having the feature amounts calculated by the feature amount extractor 22. For example, if the center point of a destination area candidate is positioned at x=115 and y=53, the conversion table of FIG. 8 is referenced to decide that the x belongs to an x range of 110 to 120 and the y belongs to a y range of 50 to 55. Accordingly, it is possible to decide for the destination area candidate that the destination probability is 0.70, the addresser probability is 0.20, and the design probability is 0.10. In the destination-addresser probability calculator 23, according to the feature amounts shown in FIG. 6, it is possible to obtain the destination probability p, the addresser probability q, and the design probability r of the respective destination area candidates as shown in FIG. 7.

Figure 11:
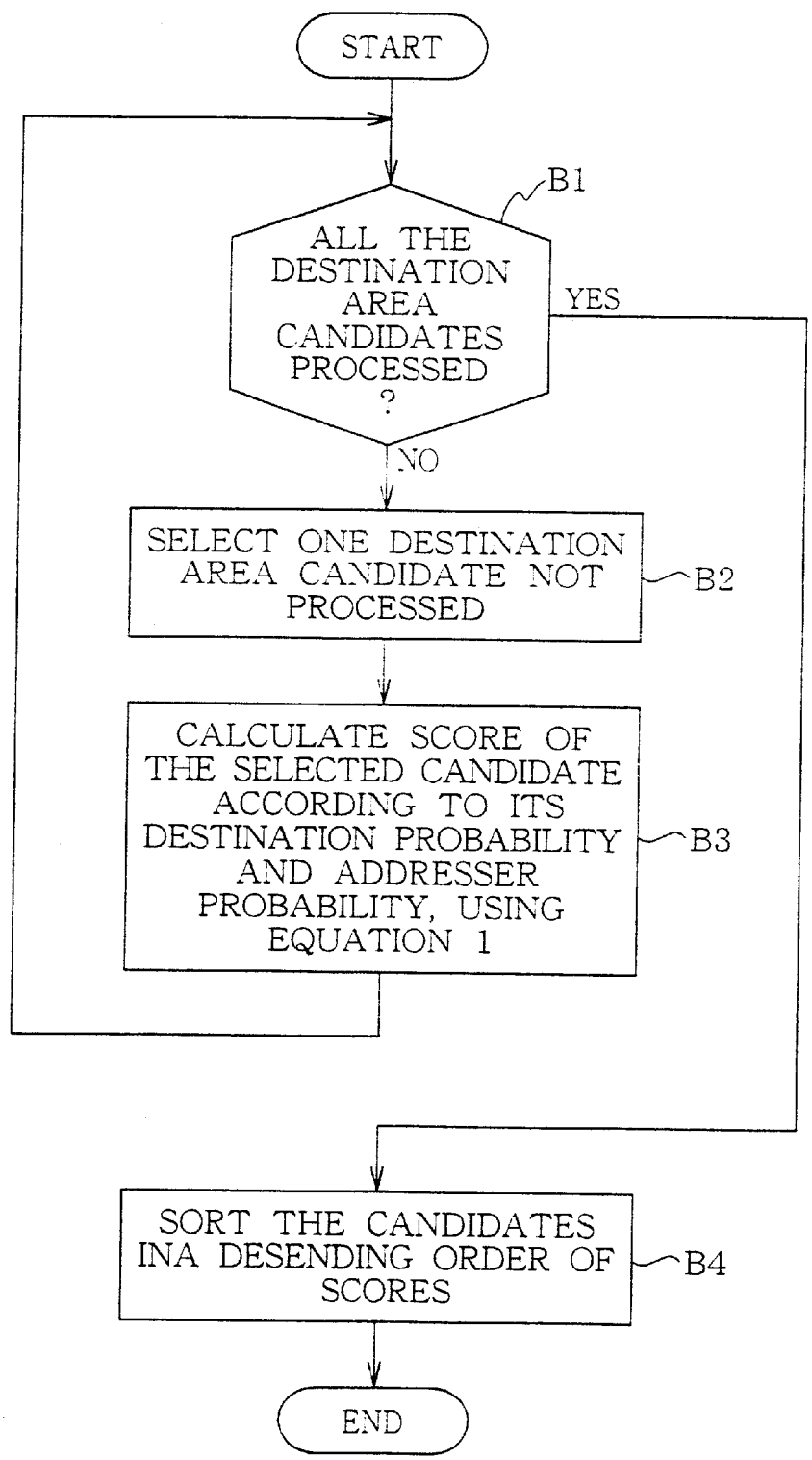
FIG. 11 is a flowchart showing a process flow of the sorting unit.

Next, the sorting unit 24 performs a processing to determine the sequential order of all the destination area candidates according to the destination probability and the addresser probability of the destination area candidates obtained in the destination-addresser probability calculator 23. FIG. 11 is a flowchart showing a processing flow of the sorting unit 24. Firstly, it is determined whether all the destination area candidates have been processed (step B1). If any candidates are not processed, one of them is selected (step B2). The selection order may be any order. Next, for the selected destination area candidate, a score is calculated according to the Equation (1) assuming p as the destination probability and q as the addresser probability (step B3). Note that the functions f and g use u as an argument: f(u)=u, and function g(u)=u.

By repeating the processing of steps B1 to B3, a score of each of the destination area candidates is calculated. When the scored of all the destination area candidates are calculated, the destination area candidates are sorted in the descending order of the scores (step B4). This is the sequential order of all the destination area candidates obtained by the sequential order decision processing. In step B3, for example, in the case of FIG. 6, scores are calculated according to the Equation (1) and the results shown in FIG. 9 are obtained, i.e., the sequential order is G5, G4, G3, G2, and G1. Here, it is assumed that f(u)=u and g(u)=u. However, the f(u) and g(u) may be any monotone increasing functions. Moreover, as has been described above, the scores may be calculated using the Equations (2) to (6) instead of the Equation (1).

Figure 12:
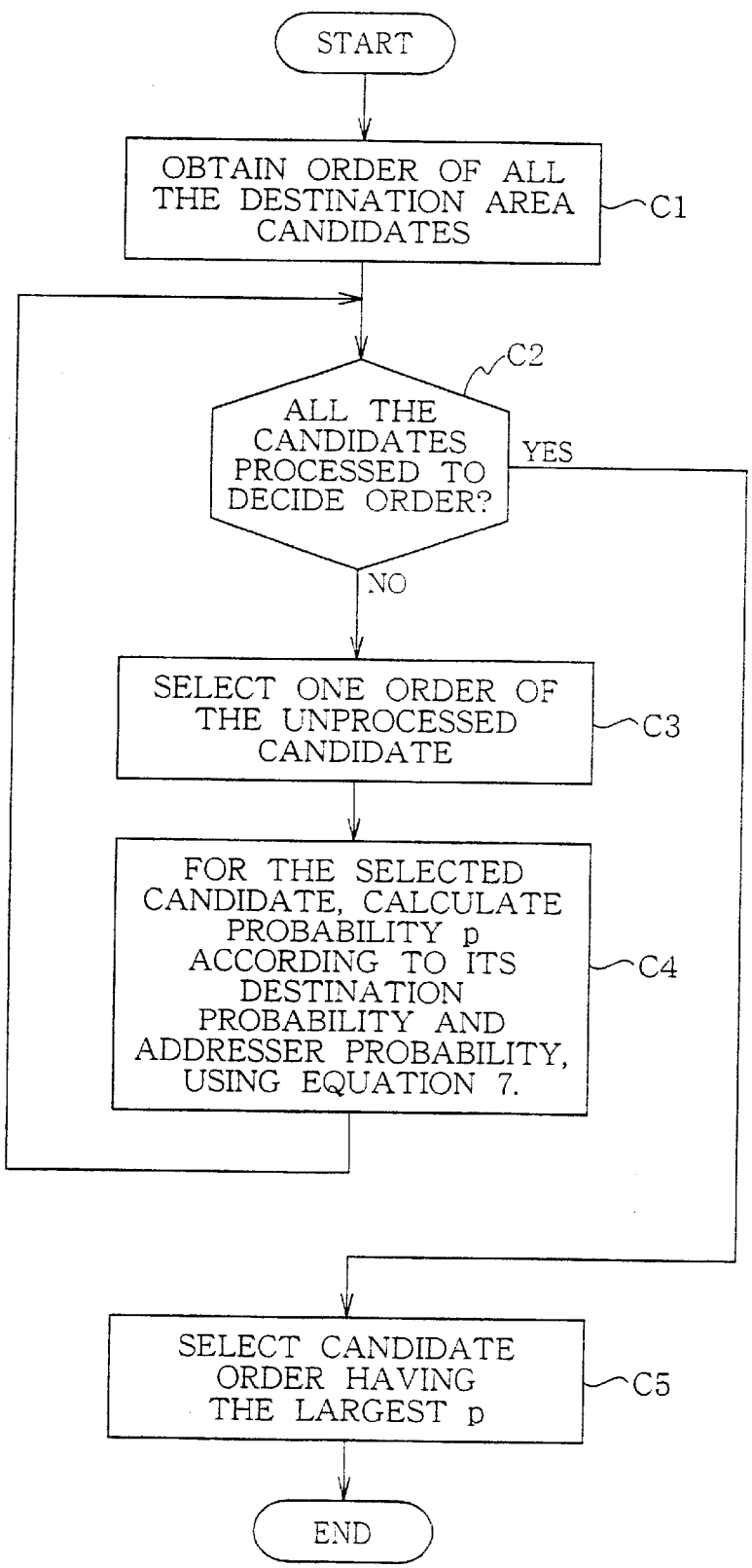
FIG. 12 is a flowchart showing another process flow of the sorting unit.

FIG. 12 is a flowchart showing another order decision method by the sorting unit 24. Firstly, all the possible orders of the plurality of destination area candidates are created (step C1). Next, it is determined whether all the orders have been processed (step C2). If there are any orders which have not been processed, one order is selected from them (step C3). The selection may be in any order. Next, for the order of the selected destination area candidate, the probability P that the destination area precedes the addresser area is calculated using the Equation (7) (step C4). Thus, the processing of the steps C2 to C4 is repeatedly performed so as to obtain the probability p for each of the orders. Moreover, the order of the destination area candidates having the maximum probability p is identified (step C5). This is the order for all the destination area candidates obtained by the order decision processing.

The output candidate decision unit 25 outputs the destination area candidates according to the order of the destination area candidates obtained by the sorting unit 24. If the number of destination area candidates to be output is two, G5 and G4 are output. Moreover, if the number of destination area candidates to be output is one, only G5 is output.

Next, explanation will be given on a creation method of the destination-addresser distribution dictionary 31. The destination-addresser distribution dictionary indicates correspondence between a feature amount range and a destination probability, addresser probability, and design probability of the destination area candidate having a feature amount in that range. Now, it is assumed that a feature amount range is expressed by A, and the destination area candidate in the range has the destination probability p(A), addresser probability q(A), and design probability r(A). Moreover, for the range A, functions hp(A), hq(A), and hr(A) are prepared, which will be referred to as a destination area frequency, addresser area frequency, and design area frequency, respectively.

Figure 13:
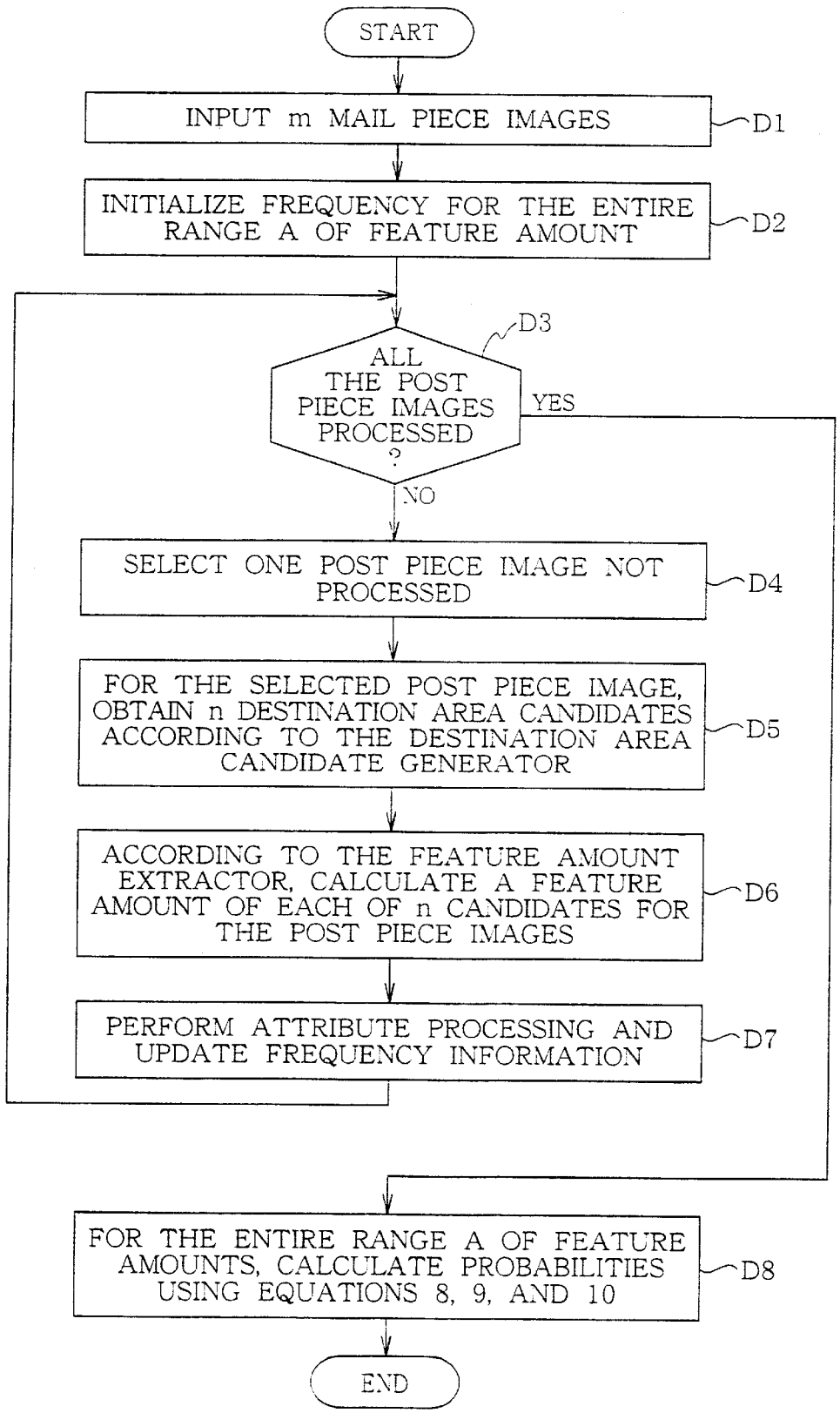
FIG. 13 is a flowchart showing a method for creating a destination-addresser distribution dictionary.

FIG. 13 is a flowchart for creating a destination-addresser distribution dictionary 31. Firstly, m mail piece images are prepared as a learning data. Moreover, for the feature amount, i.e., an absolute position x, y of the center point of each area candidate, the minimum value $x_s$ and the maximum value $x_1$ are determined for x, and minimum value $y_s$ and maximum value $y_1$ are determined for y. For example, it is possible to set $x_s$ as 0, $x_1$ as the maximum value of the width (in the x axis direction of FIG. 5) of the m mail piece images; $y_s$ as 0, and $y_1$ the maximum value of the length (in the y axis direction of FIG. 5). The width and the length are assumed to use pixels like the feature amount x and y. And, for a certain integer k, the range of $k^2$ is considered as follows:

$$x_s+(i\times(x_1-x_s))/k \text{ to } x_s+((i+1)\times(x_1-x_s))/k$$

and $$y_s+(j\times(y_1-y_s))/k \text{ to } y_s+((j+1)\times(y_1-y_s))/1$$

(considering all the combinations of i=0, 1, 2, . . . , k−1, and j=0, 1, 2, . . . , k−1). In this embodiment, k is 10 and 100 ranges are used. It should be noted that in the present embodiment, a range is set at an identical interval for each feature amount, but it is not an essential problem.

More specifically, firstly, m mail piece images are input (step D1 in FIG. 13). Next, for the entire feature amount range A, frequency initialized (step D2) by substituting 0 in the destination frequency hp(A), the addresser frequency hq(A), and the design frequency hr(A). Moreover, it is determined whether all the m mail piece images have been subjected to the processing of step D5 (step D3). If any mail piece images have not been processed, one mail piece image is selected from them (step D4). The selection order may be any order. The selected mail piece image is input so as to create n destination area candidates by the destination area candidate generator 21 (step D5). Next, for each of the destination area candidates, a feature amount, (i.e., the absolute position x, y of the center point of the destination area candidate.) is calculated (step D6).

Here, for a certain destination area candidate, assuming that the feature amount of the destination area belongs to the feature amount range A, it is visually determined whether the destination area candidate is a destination area, an addresser area, or a design area. If the destination area candidate is found to be a destination area, the value of hp(A) is incremented by one; if the destination area candidate is found to be an addresser area, the value of hq(A) is incremented by one; and if the destination area candidate is a design area, hr(A) value is incremented by one (step D7). In step D7, by performing the aforementioned processing to the destination area candidate, frequency is updated. The process of steps D3 to D7 are repeatedly performed for all the main piece images. When the processing of all the mail piece images is complete, Equation (8), Equation (9), and Equation (10) are used to calculate the destination probability p(A), addresser probability q(A), and the design probability r(A) for the feature amount range (step D8).

[Equation 8]

$$p(A)=hp(A)/(hp(A)+hq(A)+hr(A)) \quad (8)$$

[Equation 9]

$$q(A)=hq(A)/(hp(A)+hq(A)+hr(A)) \quad (9)$$

[Equation 10]

$$r(A)=hr(A)/(hp(A)+hq(A)+hr(A)) \quad (10)$$

Thus, feature amounts and probabilities are obtained, which are stored in the destination-addresser distribution dictionary 31 with correspondence between the entire probability range and p(A), q(A), and r(A).

Figure 14:
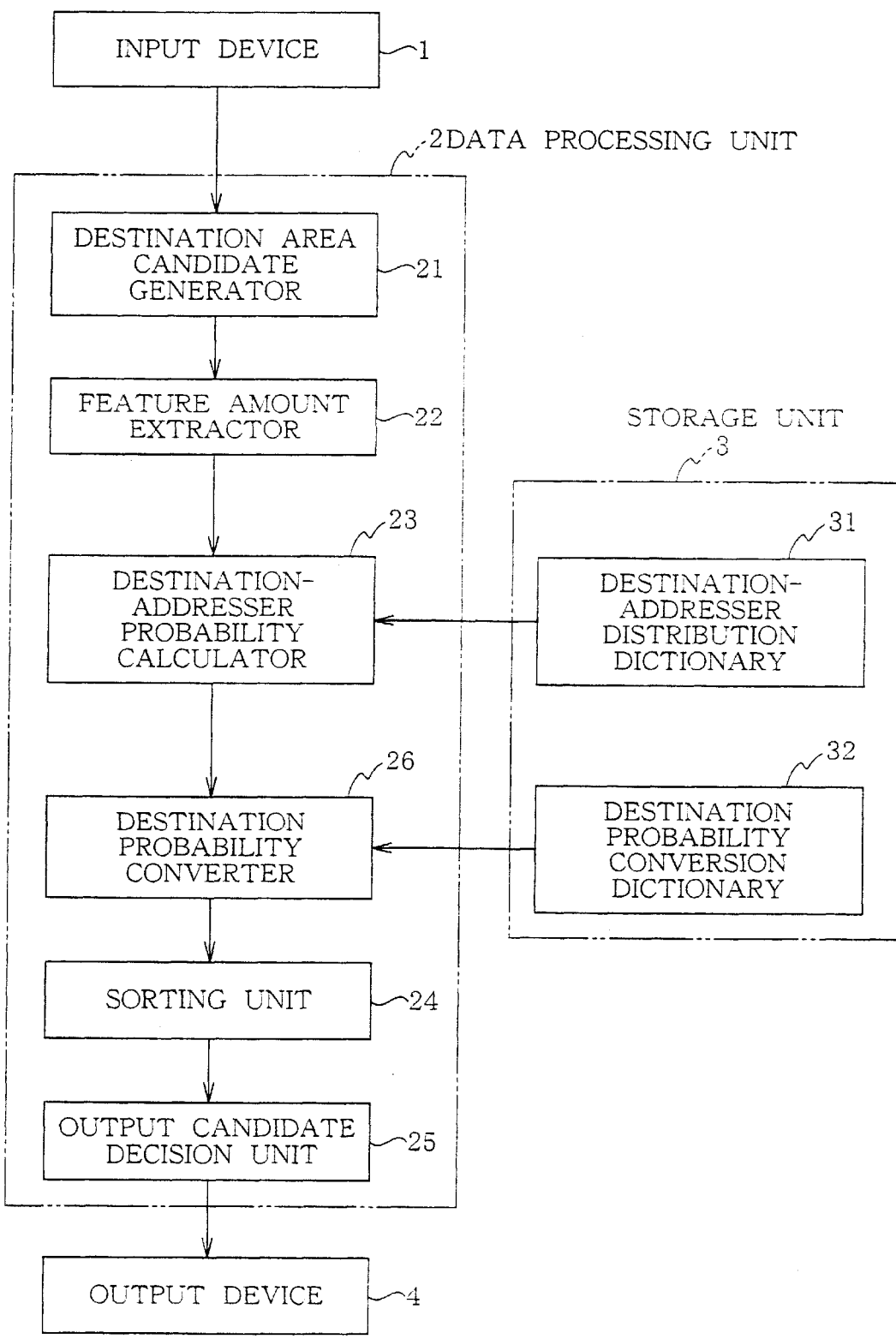
FIG. 14 is a block diagram showing a configuration of the second embodiment of the present invention.

FIG. 14 is a block diagram showing a second embodiment of the present invention. In the second embodiment, a destination-probability conversion dictionary 32 is provided in the storage unit 3 of the first embodiment, and destination-probability converter 26 is provided in the data processing unit 2. The destination-probability converter 26 is used to correct the destination probability, addresser probability, and design probability obtained by the destination-addresser probability calculator 23. The destination-probability conversion dictionary 32 is used to store information required for converting an old destination probability to a new destination probability by the destination-probability converter 26.

In the first embodiment, a destination probability and an addresser probability of each destination area candidate have been calculated independently for each of the regions and does not reflect the fact that only one destination area is present among the destination area candidates. The second embodiment, taking this fact into consideration, attempts to improve the detection accuracy of the destination area. Firstly, definitions of terms to be used are given. The probability that a destination area candidate is a destination area, among all the destination area candidates, according to a feature amount obtained by the feature amount extractor 22 is the destination probability of the destination area candidate. Moreover, an addresser probability is defined as the probability that a destination area candidate is an addresser area, under the condition that a destination area candidate other than the destination area candidate which is now concerned is a destination area. Furthermore, a design probability is defined as the probability that a destination area is a design area under the condition that a destination area candidate other than the destination area concerned is a destination area.

Assuming that the destination probability is p', the addresser probability is q', and the design probability r', the probability that a destination area candidate is an addresser area and design area can be expressed (1−p')q' and (1−p')r', respectively. Hereinafter, the probability obtained by the destination-addresser probability calculator 23 will be referred to as an old probability and the probability obtained by the destination probability converter 26 will be referred to as a new probability. For example, when the destination area candidates G1, G2, G3, G4, and G5 are obtained as shown in FIG. 4, their new destination probability p', new address probability q', and new design probability r' are as shown in FIG. 15. In FIG. 15, of the destination area candidates G1, G2, G3, G4, and G5, G1 has a new destination probability of 0.04 and G2 has a new destination probability of 0.08.

The destination probability converter 26 converts the old destination probability p, the old addresser probability q, and the old design probability r into a new destination probability p', a new addresser probability q', and a new design probability r', respectively, according to the destination probability conversion dictionary 32. In the destination probability converter 26, the new destination probability p' is calculated from the old destination probability p obtained in the destination-addresser probability calculator 23, using, for example, the following Equation 11.

[Equation 11]

$$p'=p/S \quad (11)$$

wherein S is a sum of old destination probabilities in all the destination area candidates.

Alternatively, for example, the destination probability conversion dictionary 32 may contain a conversion table between a range of an old destination probability p of a destination area candidate, a range of the maximum value $p_{max}$ of the old destination probability of a destination area candidate other than the destination area candidate concerned, and a new destination probability P' of the destination area candidate. The destination probability conversion dictionary 32, for example, can be expressed as shown in FIG. 16. Since a great amount of data is involved, FIG. 16 shows only a part of the dictionary 32 (the three-dot marks represent a part omitted). Now, it is assumed that a probability range is A, and a destination area candidate having p and $p_{max}$ in that range A has a new destination probability p' (A), a new addresser probability q' (A), and a new design probability r' (A). Moreover, functions hp(A), hq(A), and hr(A) are prepared for the range A, which will be referred to as a destination area frequency, addresser area frequency, and design area frequency, respectively.

Figure 17:
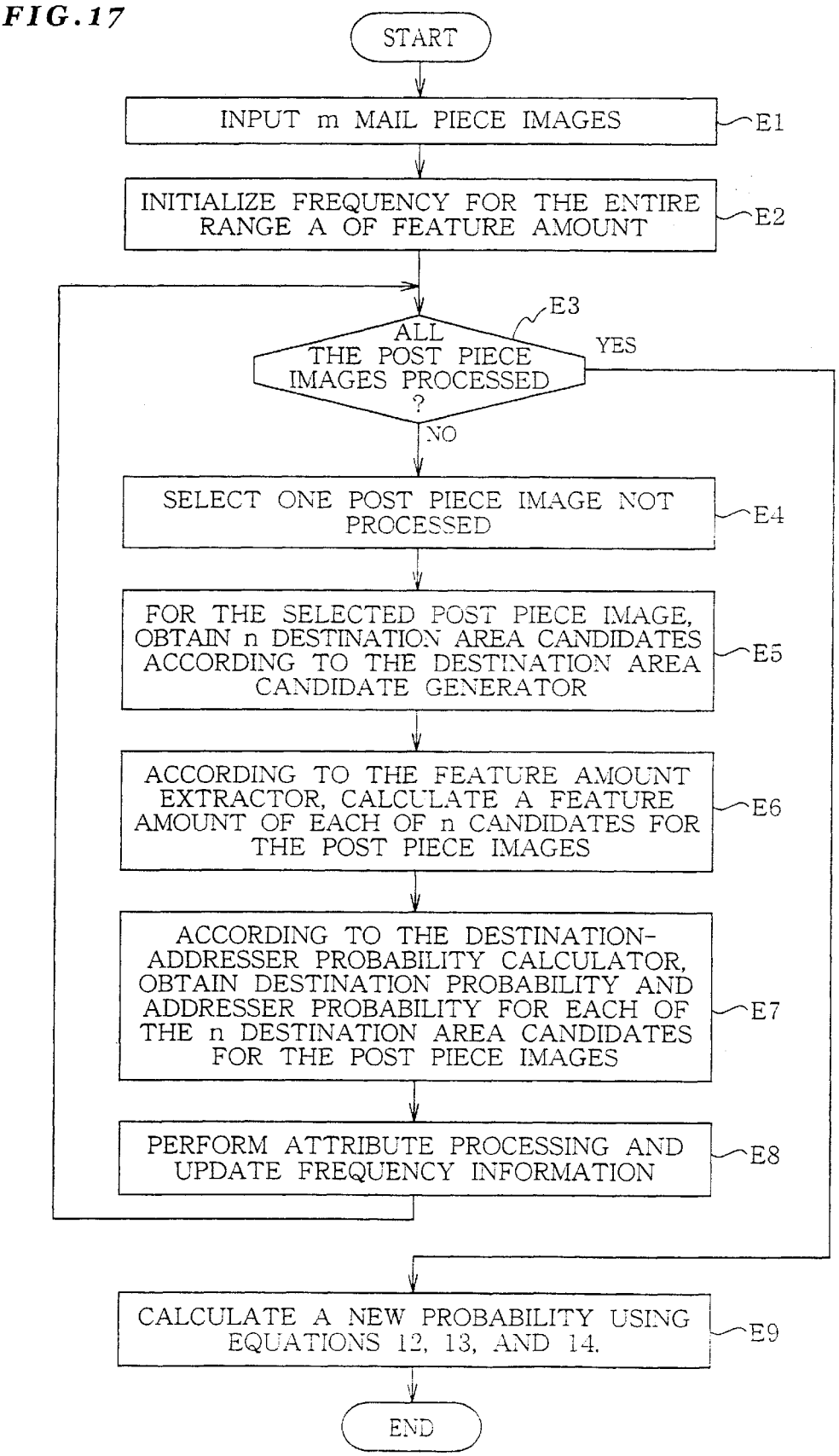
FIG. 17 is a flowchart showing a method for creating the destination probability conversion dictionary.

FIG. 17 is a flowchart showing a method for creating the destination probability dictionary 32. Firstly, m mail piece images are prepared as learning data items. Moreover, a minimum value as and a maximum value a1 of p and a minimum value bs and a maximum value b1 of $p_{max}$ are determined beforehand. For example, the as is set to 0, a1 is set to 1, whereas bs is set to 0 and b1 is set to 1. And for a certain integer k, $k^2$ is considred when the feature amount p is:

$$a_s+(i\times(a_1-a_s))/k \text{ to } a_s+((i+1)\times(a_1-a_s))/k;$$

and the feature amount $p_{max}$ is:

$$b_s+(j\times(b_1-b_s))/k \text{ to } b_s+((j+1)\times(b_1-b_s))/k$$

(considering all the combinations of i=0, 1, 2, ..., k−1, j=0, 1, 2, ..., k−1). In this embodiment, k is assumed to be 20 and the total range of 400 is used. It should be noted that in this embodiment, the feature amounts are set at an identical interval, but this is not an essential problem.

More specifically, firstly, m mail piece images are input (step E1 in FIG. 17). Next, for the entire feature amount range A, a destination frequency hp(A), an addresser frequency hq(A), and a design frequency hr(A) are substituted, so as to initialize the frequency (step E2). Moreover, it is determined whether all the m mail piece images have been processed (step E3). If there are any images unprocessed, one of them is selected (step E4). The selection order may be any order. Next, for the selected mail piece image, n destination area candidates are created by the destination area candidate generator 21 (step E5). Moreover, for each of the n destination area candidates, its feature amount, i.e., the absolute position x, y of the center point is calculated (step E6). Furthermore, for each of the n destination area candidates, using the feature amount obtained in step D5, an old destination probability, an old addresser probability, and an old design probability are calculated by the destination-addresser probability calculator 23 (step E7).

Here, assuming for a certain destination area candidate that an old destination probability of the destination area and an old destination probability of the destination area candidate have a maximum value belonging to the probability range A, it is determined by visual observation whether the destination area candidate is a destination area or an addresser area or a design area. If the destination area candidate is found to be a destination area, the value of hp(A) is incremented by one; if the candidate is an addresser area, the value of hq(A) is incremented by one; and if the candidate is a design area, the hr(A) value is incremented by one (step E8). In step E8, the aforementioned processing is performed to the n destination area candidates of the mail piece images. The processing of step E3 to step E8 is repeatedly performed so as to process all the mail piece images.

When the processing is complete for all the mail piece images, the following Equations (12), (13), and (14) are used to calculate a new destination probability p' (A), a new addresser probability q' (A), and a new design probability r' (A) (step E9).

[Equation 12]

$$p'(A)=hp(A)/(hp(A)+hq(A)+hr(A)) \quad (12)$$

[Equation 13]

$$q'(A)=hq(A)/(hq(A)+hq(A)+hr(A)) \quad (13)$$

[Equation 13]

$$r'(A)=hr(A)/(hq(A)+hq(A)+hr(A)) \quad (14)$$

Thus, a new probability is obtained, and a correspondence of the entire probability range A with p' (A), q' (A), and r' (A) are stored in the destination probability conversion dictionary 32. FIG. 16 shows a table for conversion into a destination probability p' according to old destination probability p of two destination area candidates. It is also possible to use more than two destination area candidates, or to additionally use an old addressing probability or an old design probability.

Next, for each of the destination area candidates, calculation is performed to determine a new addresser probability q' and a new design probability r', assuming q for the old addresser probability and r for the old design probability, using Equations (15) and (16).

[Equation 15]

$$q'=q/(q+r) \quad (15)$$

[Equation 16]

$$r'=r/(q+r) \quad (16)$$

For example, when the destination-addresser probability calculator 23 has calculated an old destination probability p, old addresser probability q, and old design probability r as shown in FIG. 7, the destination probability converter 26 can obtain a new destination probability p', a new addresser probability q', and a new design probability r' as shown in FIG. 15, using the Equations (11), (15), and (16). After this, the new destination probability, the new addresser probability, and the new design probability are assumed to be destination probability, an addresser probability, and a design probability, and the processing identical to the first embodiment is performed. For example, in case of FIG. 15, Equation (1) is used to calculate scores as shown in FIG. 18, where the destination area candidate G5 has the highest score of 0.07. Note that the functions f and g are, for the argument u, f(u)=u, and g(u)=u.

As has been described above, when detecting a destination area from the destination area candidates, considering an addresser probability of an addresser area which is not a destination but has an address configuration, a destination probability is subtracted by the addresser probability so that the addresser area will not be output. This can reduce the erroneous detection of an addresser area as a destination area, thus increasing the detection accuracy of the destination area.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-006801 (Filed on Jan. 13$^{th}$, 1999) including specification, claims, drawings and summary are incorporated herein by reference in its entirety.

What is claimed is:

1. A destination area detection apparatus comprising:

destination area candidate generator for generating a plurality of destination area candidates including a destination area according to partial images of a mail piece image;

feature amount extractor for calculating a feature amount of each of the destination area candidates;

storage unit for storing in advance a feature amount and a destination probability representing probability that a destination area candidate is a destination area according to the feature amount, in correlation with an addresser probability which is a probability of an area having an address configuration other than the destination;

feature amount converter for converting the feature amount of each of the destination area candidates into a destination probability and an addresser probability while referencing the storage device;

sorting unit for deciding the order of the destination area candidates in a descending order of the destination probability according to the destination probability and the addresser probability; and destination area selector for selecting a predetermined number of destination area candidates having higher destination probabilities.

2. A destination area detection apparatus as claimed in claim 1, wherein the sorting unit calculates a score of each of the destination area candidates according to the destination probability and the addresser probability and decides the order of the destination area candidates in a descending order of the scores.

3. A destination area detection apparatus as claimed in claim 1, wherein the sorting unit, according to the destination probability and the addresser probability, calculates a probability that a destination probability precedes the addresser probability, and selects an order to make this probability maximum, thus deciding the order of the destination area candidates.

4. A destination area detection apparatus as claimed in claim 1, wherein the feature amount extractor extracts an absolute position of a center point of each destination area candidate as a feature amount.

5. A destination area detection apparatus as claimed in claim 1, the apparatus further comprising probability corrector for correcting the destination probability and the addresser probability, reflecting the fact that only one destination area is present.

* * * * *